April 14, 1970  C. A. HASKELL  3,505,882

TUNED ROTOR SQUEEZE-FILM BEARING GYROSCOPE

Filed Jan. 4, 1968

INVENTOR.
Clarence A. Haskell
BY
Thomas N. Young
ATTORNEY

United States Patent Office 3,505,882
Patented Apr. 14, 1970

3,505,882
TUNED ROTOR SQUEEZE-FILM BEARING GYROSCOPE
Clarence A. Haskell, Marblehead, Mass., assignor to General Motors Corporation, Detroit, Mich., a corporation of Delaware
Filed Jan. 4, 1968, Ser. No. 695,674
Int. Cl. G01c *19/16, 19/28*
U.S. Cl. 74—5                                                                5 Claims

ABSTRACT OF THE DISCLOSURE

A gyroscopic instrument including a rotor having a spin axis and a squeeze-film gas bearing between the rotor and its support shaft to permit rotor deflection about an axis orthogonal to the spin axis.

SUMMARY OF THE INVENTION

This invention relates to gyroscopic instruments of the single-hinge tuned rotor type and more particularly to a novel rotor support-bearing design for such an instrument.

In a conventional gyroscopic device, a rotor is suspended for rotation about an axis of symmetry to define an angular momentum vector which normally aligns with the spin reference axis. Angular rotation of the rotor about a second axis perpendicular to the spin reference axis causes the angular momentum vector to precess, or rotate, about a third axis which is mutually perpendicular to the spin reference and second axes. In a conventional two-axis gyro, the rotor is universally suspended such that the precession is uniform and independent of angular displacement about the spin axis. In a single-hinge tuned-rotor gyro, however, the rotor is not universally suspended, but is permitted to rotate or precess only about a single axis perpendicular to the spin axis and rotating with the rotor. Accordingly, the precessional rotation is nonuniform and depends on the angular displacement as well as the rate of rotation about the spin axis.

In accordance with the present invention, the rotor of a single-hinge tuned rotor gyro is supported relative to the rotating support structure on a thin film of pressurized fluid such as air or helium gas. This provides a stiff support for the rotor without introducing undesired friction which limits gyro sensitivity. This is accomplished by a pressure-generating bearing structure which includes a body of magnetostrictive material having a cylindrical bore, together with winding means for causing a time-varying flux about the bore. This time varying flux produces a periodic radial constriction of the bore. A diametric spoke of the gyro rotor is disposed within the bore in radially spaced relation such that the bore constrictions produce a pumping action on any fluid medium between the bore and spoke thereby supporting the spoke with respect to the bore.

The particular advantages accruing from the invention as applied to a gyroscopic device of illustrative design are more fully described in the following specification and accompanying drawings of which:

Figure 1:
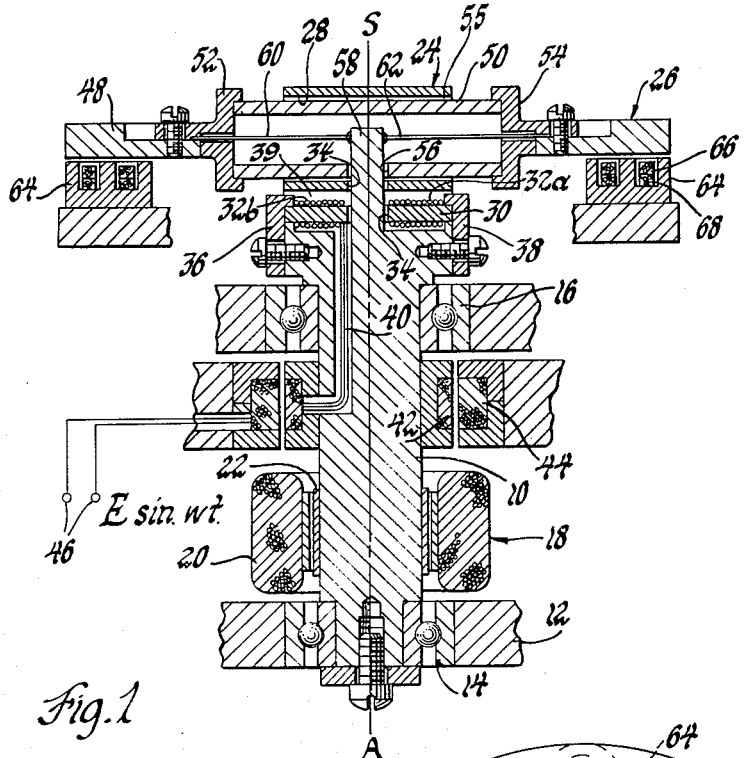
FIGURE 1 is a cross-sectional view of a single-hinge tuned gyro embodying the invention.

In the drawing, FIGURE 1 shows the illustrative embodiment of the invention to include a shaft 10 having a longitudinal axis which corresponds to the spin axis, SA, of the gyro. The shaft 10 is mounted for rotation relative to a fixed frame 12 by means of ball bearings 14 and 16. The shaft 10 is driven about the spin axis by a synchronous hysteresis motor 18. The motor comprises a winding 20 for producing a rotating magnetic field and a hysteresis ring 22 which is fixed to the shaft and which rotates the shaft in synchronism with the magnetic field produced by winding 20.

Figure 3:
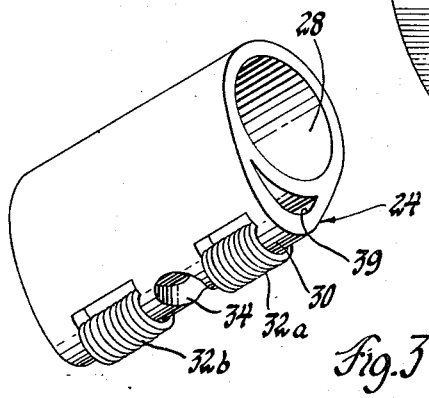
FIGURE 3 is a detailed view of an illustrative rotor bearing body member.

In the upper part of the assembly, as shown in FIGURE 1, reference character 24 designates a bearing body which is adapted to receive and support a gyroscopic rotor generally designated at 26. The bearing body 24, a detailed view of which is shown in FIGURE 3, is of generally cylindrical configuration and has formed therein a cylindrical bore 28 which may be machined to form a smooth inner bearing surface. Formed integrally with the body 24 is an axially oriented appendant arm 30 on which are wound a pair of series connected windings 32a and 32b. Mediate the windings 32a and 32b an aperture 34 is formed which, as best shown in FIGURE 1, extends through the body 24 at right angles to the bore 28 and into the interior of the body 24.

In accordance with the invention, body 24 is formed from a magnetostrictive material such that the introduction of a time varying current in the winding portions 32a and 32b produces a time varying flux pattern around the bore 28 to produce cyclically varying radial constrictions of the body. The frame 12 may hermetically seal the apparatus shown and be filled with air or an inert gas such as helium. The radial constrictions thus produce a pumping action on the gas to support the rotor 26 free from physical contact with the body 24 as will be described in the following paragraphs.

The magnetostrictive bearing body 24 may be clamped to the shaft 10 for rotation therewith about the axis SA by means of two L-shaped retaining brackets 36 and 38. Brackets 36 and 38 engage body 24 by means of a crescent shaped axial aperture 39 between the main portion of the body 24 and the appendant arm 30. The brackets are then secured to shaft 10 by means of screws which engage threaded holes in the shaft 10.

The windings 32a and 32b are connected to leads 40 which travel axially through the shaft 10 to the secondary winding 42 of a rotary transformer also comprising a primary winding 44 which is fixed to the frame 12 as shown in FIGURE 1. The primary winding 44 is provided with a pair of input terminals 46 which may be connected across a source of sinusoidally varying current to produce the aforementioned time varying flux field in the bearing body 24.

Figure 2:
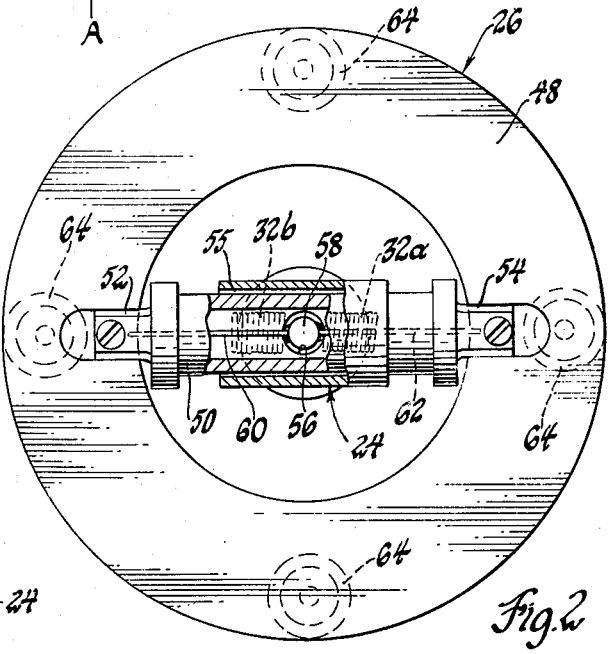
FIGURE 2 is a plane view, partly in cross-section, of the gyro showing the rotor configuration.

The gyroscopic rotor 26 comprises, as shown in FIGURES 1 and 2, a heavy annular rim 48 and a hollow cylindrical center portion 50 which is joined to the rim 48 by a pair of adapter brackets 52 and 54. As best shown in FIGURE 2, the assembly comprising center portion 50 and brackets 52 and 54 forms a spoke which is connected to the rim 48 at diametrically opposite points thereon.

The cylindrical center portion 50 is dimensioned so as to be accommodated within the cylindrical bore 28 of the bearing body 24 in radially spaced relation to form a small radial gap 55 which is greatly exaggerated for purposes of illustration in the drawings. The gyroscopic device may be operated in an atmosphere of fluid such as air or helium such that the gap 55 is filled with the fluidic medium. In addition, center portion 50 has formed therein an aperture 56 which may be lined up with the aperture 34 in bearing body 24 to accommodate an axially extending stub portion 58 of shaft 10. The stub portion 58 of shaft 10 extends through the bearing body 24 and the center portion 50 of the rotor spoke to the interior of the center portion 50 as best shown in FIGURE 1. To provide torsional restraint on the rotor 26 about the axis defined by the spoke member, a pair of torsion wires 60 and 62 are secured between the stub portion 58 of shaft 10 and the rotor brackets 52 and 54. The wires 60 and 62 act as torsion springs to resist angular deflection of the rotor 26 with respect to the bearing body 24 about the axis defined by spoke 50, 52, 54.

In operation, the primary terminals 46 of the rotary transformer are connected to a source of sinusoidally varying voltage thereby energizing winding portions 32a and 32b. The energization of the winding causes a time varying flux field to exist in the magnetostrictive bearing body 24 to set up the periodic radial constrictions of the body previously described. These radial constrictions produce a pumping action on the fluid medium in the gap 55 between the center portion 50 of the rotor spoke and the interior of the bore 28 in the bearing body 24. This pumping action produces pressurization of the fluid medium and suspends the rotor spoke portion 50 free from physical contact with the bearing body 24. Accordingly, a substantially frictionless suport for the rotor is provided which permits angular rotation of the rotor 26 about the axis of the spoke. This rotation is, of course, resisted by the spring action of the torsion wires 60 and 62. This spring action, of course, has a natural frequency of oscillation which can be determined.

At this point the motor 18 is energized to rotate the combination of shaft 10, bearing body 24 and rotor 26 about the axis SA. In accordance with the known principles of operation of tuned rotor gyros, the shaft is rotated at an angular frequency which corresponds to the natural oscillatory frequency of the rotating spring suspended rotor 26. Angular inputs about an axis perpendicular to the spin axis SA cause a precessional tendency in the rotor 26 about an axis perpendicular to the input axis. However, this precessional tendency may rotate the rotor 26 relative to the bearing body 24 only when the compliant axis defined by the spoke 50, 52, 54 lines up with the aforementioned output axis. Accordingly, a non-uniform precessional oscillation is set up which is related to the angular input to the gyroscopic device.

To detect this output motion of the rotor 26, a group of four uniformly spaced electromagnetic pickoffs 64 may be disposed on the fixed frame 12 adjacent to but spaced from a surface of rim portion 48. As shown in FIGURE 1, each pickoff comprises a disk shaped core of magnetic material having an annular groove formed therein to produce an E shaped cross section. Disposed within the groove is a primary winding 66 which is adapted to be connected to a source of alternating current and a secondary winding 68 which may be connected to a readout device such as a meter. The rim portion 48 may be constructed of low reluctance material such that the magnetic transfer between the primary winding 66 and the secondary winding 68 depends upon a flux path which extends into and through the portion of rim 48 immediately adjacent the pickoff 64. Accordingly, variations in the gap between rim 48 and the core of pickoffs 64 produce a variation in the amplitude of the signal in secondary winding 68. These amplitude variations are interpreted by a suitable readout device to yield information regarding the nature of the angular input to the gyroscopic device. The use of four electromagnetic pickoffs 64 at uniform spacings of 90° around the rim 48 gives the instrument a two axis capability. Accordingly, any angular input having a component along an axis in the normal plane of rotor 26 may be detected by the device.

It is to be understood that the foregoing description of an illustrative embodiment of the invention is not to be construed as limiting the invention to the particular apparatus described.

I claim:
1. In a gyroscopic instrument: a rotor having a annular rim portion and a spoke portion extending between diametrically opposite points on said rim, said spoke having a cylindrical center portion; bearing means including a body of magnetostrictive material having a cylindrical bore, and an appendant arm portion which is magnetically integrated with the body; a winding disposed on the arm portion for connection to an alternating current source to produce a time-varying flux in the body about the bore; said spoke being disposed within the bore and radially spaced therefrom to define a radial gap; a fluid within said gap; and torsionally compliant means for resisting angular displacement of said rotor with respect to said body about an axis defined by said spoke portion.

2. Apparatus as defined in claim 1 further comprising: a shaft having a longitudinal axis normally perpendicular to the plane of said rim portion and being connected to said bearing means; bearings supporting said shaft for rotation about said longitudinal axis; and a motor for driving the shaft about said longitudinal axes.

3. Apparatus as defined in claim 2 further comprising pickoff means for detecting angular displacement of said rotor about said axis defined by said spoke portion.

4. A gyroscopic instrument comprising: a rotor having an annular rim and a diametric spoke defining a compliant axis coextensive with the diametric spoke, the spoke having a hollow cylindrical center portion and an aperture extending radially therethrough; rotor bearing means including a body of magnetostrictive material having a cylindrical bore, an appendant arm portion which is magnetically integrated with the body; and a radial aperture extending through said body to said bore; a winding disposed on the arm portion; said spoke center portion being coaxially disposed within the bore in radially spaced relation to define a bearing gap; a fluid within the gap; a shaft connected to the rotor bearing means and having a portion extending through the apertures of said body and spoke center portion, bearings supporting the shaft for rotation about an axis normally perpendicular to the plane of the rim; a motor for driving the shaft, rotor bearing means and rotor about the shaft axis; means for exciting the winding with alternating current to produce a time varying flux in the body about the bore; and torsionally compliant means connecting the rim portion to the shaft portion which extends through said apertures to resist angular displacement of the rotor about said output axis.

5. Apparatus as defined in claim 4 further including pickoff means for detecting said angular displacements.

References Cited

UNITED STATES PATENTS

| | | | |
|---|---|---|---|
| 2,995,938 | 8/1961 | Brodersen et al. | 74—5 XR |
| 3,282,633 | 11/1966 | Moors | 74—5 XR |
| 3,285,075 | 11/1966 | Schneider et al. | 74—5 |
| 3,290,949 | 12/1966 | Samet | 74—5 |
| 3,339,421 | 9/1967 | Warnock | 74—5 |
| 3,386,293 | 6/1968 | Boothroyd | 74—5.6 |
| 3,402,610 | 9/1968 | Barnett | 74—5 |
| 3,417,474 | 12/1968 | Evans et al. | 74—5.5 XR |

FRED C. MATTERN, JR., Primary Examiner

M. A. ANTONAKAS, Assistant Examiner

U.S. Cl. X.R.

74—5.6